United States Patent [19]
Johnson

[11] 3,971,416
[45] July 27, 1976

[54] PREINSULATED PIPE ASSEMBLY AND PIPELINE

[75] Inventor: Ben C. Johnson, San Marcos, Tex.

[73] Assignee: Thermon Manufacturing Company, San Marcos, Tex.

[22] Filed: Aug. 16, 1974

[21] Appl. No.: 497,958

[52] U.S. Cl. .................................. 138/33; 137/341; 174/47; 219/301
[51] Int. Cl.² .......................................... H05B 3/58
[58] Field of Search ............ 138/33, 149, 177, 178; 219/296–299, 301–305, 335, 311, 315; 222/146 HE, 146 R; 338/214; 174/47; 137/341

[56] References Cited
UNITED STATES PATENTS
3,784,785    1/1974    Noland ................................ 138/33

*Primary Examiner*—Houston S. Bell, Jr.
*Attorney, Agent, or Firm*—Pravel & Wilson

[57] ABSTRACT

A preinsulated pipe assembly and pipeline formed from a plurality of such assemblies. Each pipe assembly includes a pipe with a heater housing mounted thereon to form a cavity along the exterior of the pipe and a preformed insulation layer for insulating the pipe and the heater housing. A connecting assembly is used to join the pipe assemblies and form a pipeline. Pull means detachably connected to a heating element facilitates placement of the heating element in the heater housing cavities, and a pulling assembly attached to the heater element permits removal of the heater element after installation of the pipeline.

12 Claims, 9 Drawing Figures

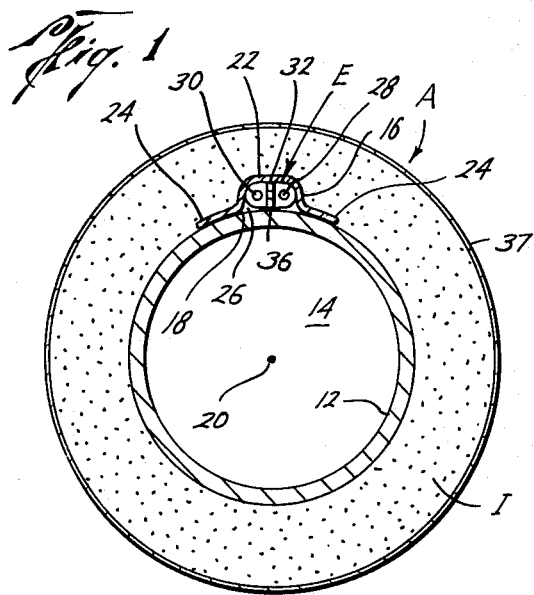
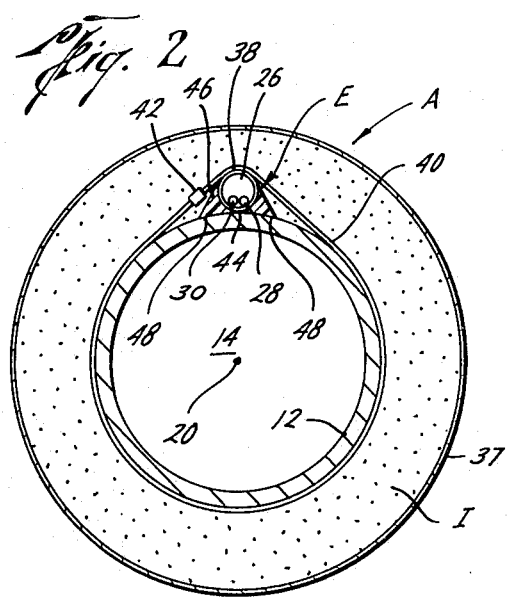
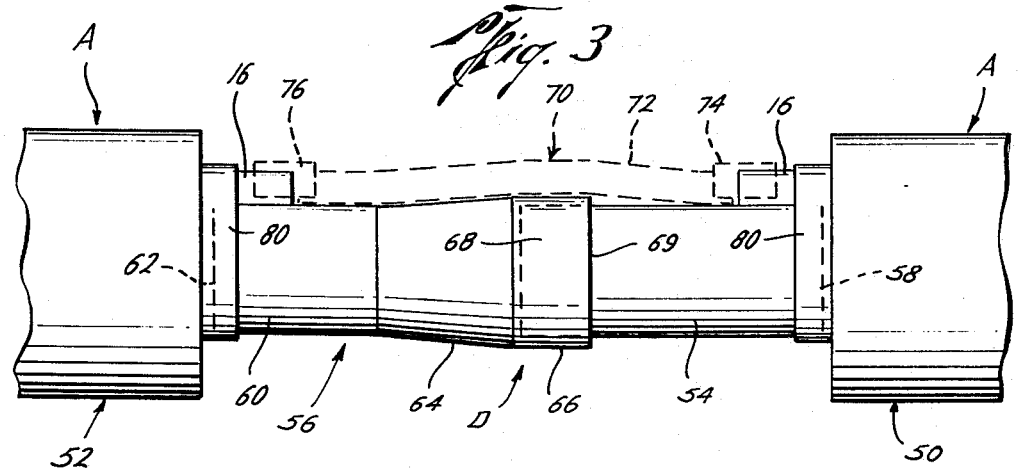
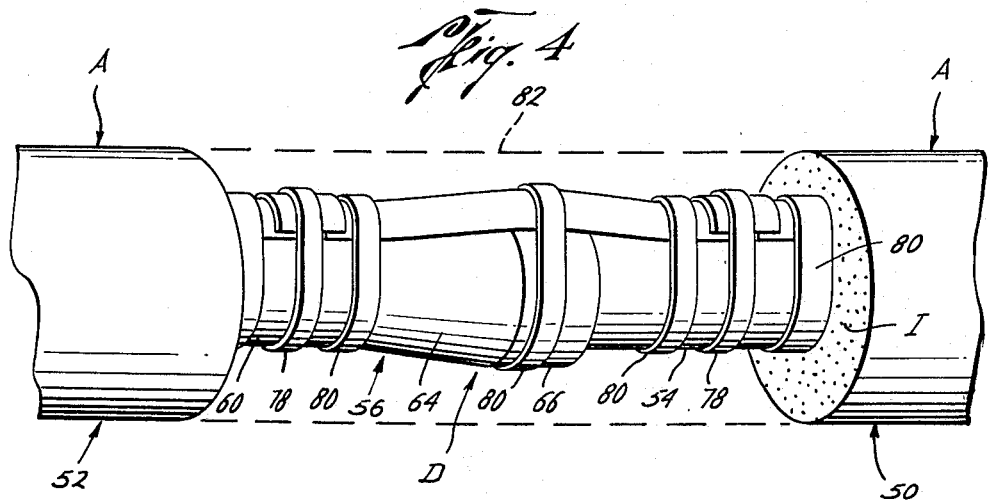

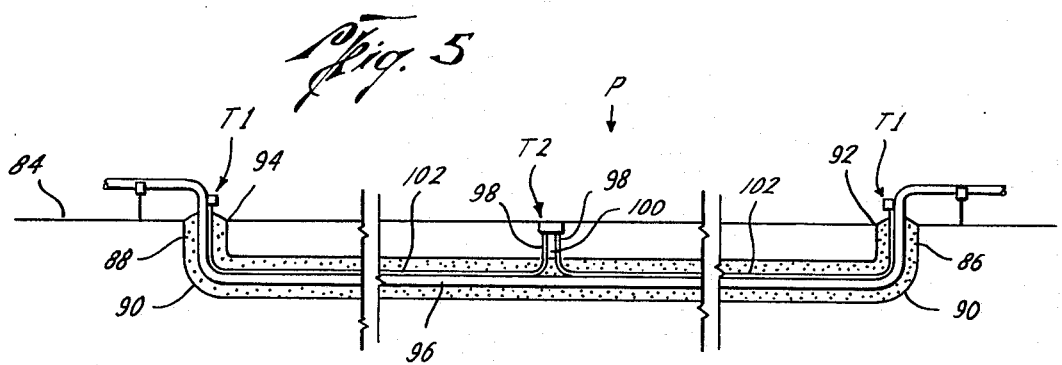
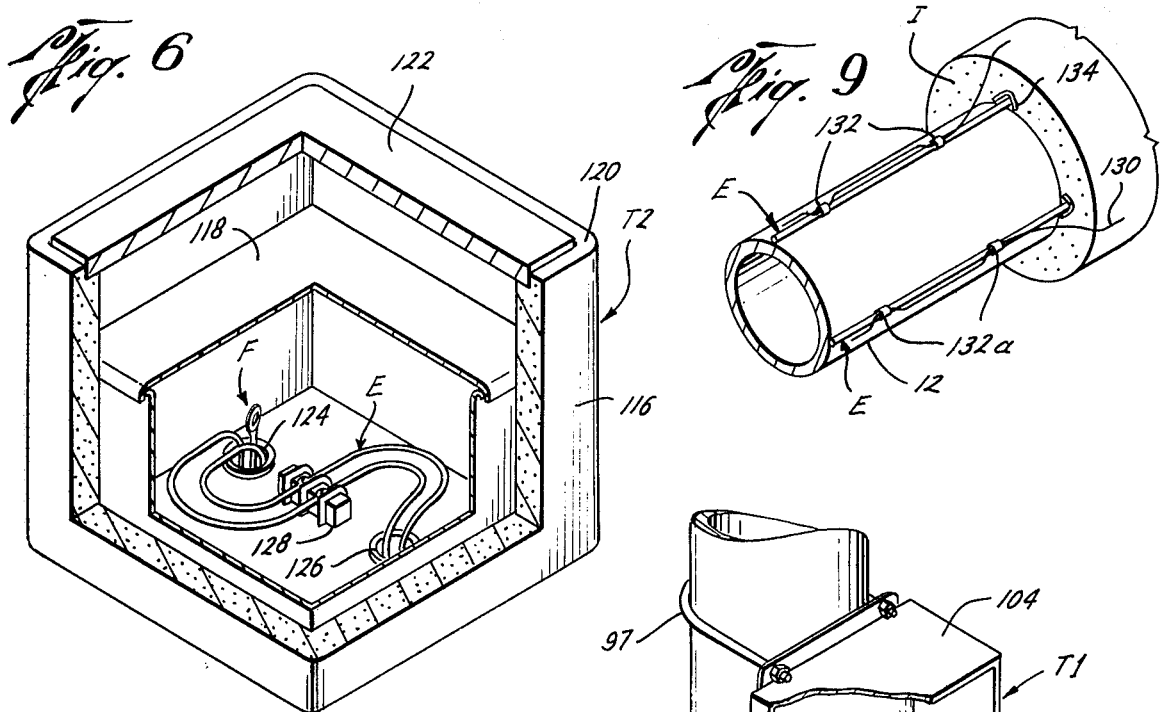
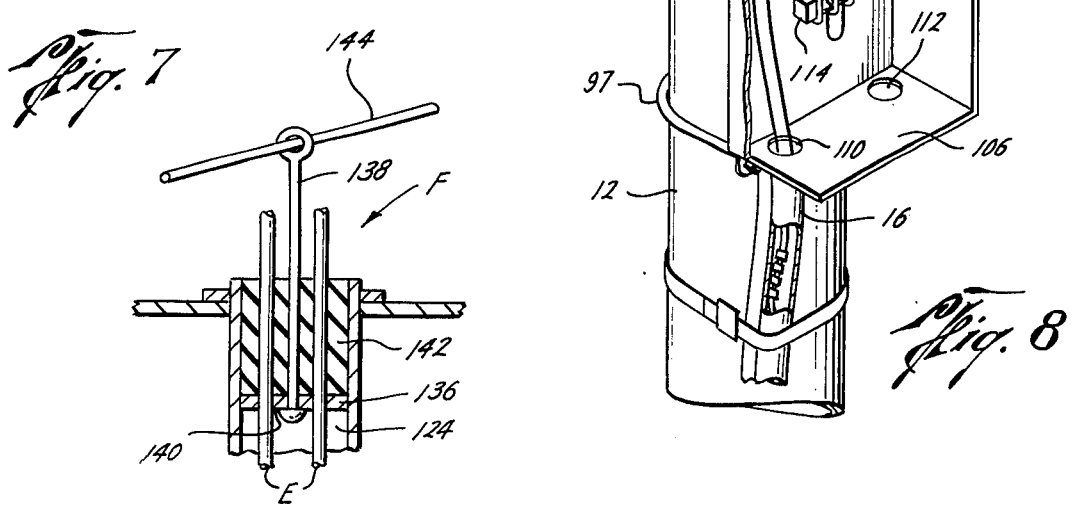

PREINSULATED PIPE ASSEMBLY AND PIPELINE

BACKGROUND OF THE INVENTION

The field of this invention is pipe assemblies and pipelines.

Pipelines in which heating elements or other thermal control apparatus are incorporated find many applications and frequently must be employed where freeze protection or thermal process control functions are to be accomplished in a pipeline.

In the past, pipelines having conduits attached to a pipe and heating elements disposed in the conduits were available. The conduit was attached to the pipe and the pipeline was insulated at the installation site. These installation operations in the field necessitated transporting large amounts of material, equipment, and manpower to the field. The installation operations were frequently performed under disadvantageous circumstances, resulting in high installation cost and sometimes poorly insulated pipelines.

Other pipelines had a permanently affixed heating element on the pipe. The heating elements were attached to the pipes at the installation site, and the pipelines were insulated after the heating elements had been affixed to the pipe. In addition, since the heating element was permanently affixed to the pipe, the heating element could not be replaced without difficulty and possible damage. Further, where such pipelines were buried underground, the pipeline had to be at least partially uncovered before the task of replacing the heating element could even begin.

SUMMARY OF THE INVENTION

It is an object of this invention to provide a new and improved pipe assembly and pipeline formed from a plurality of such assemblies.

With the pipe assembly of the present invention, a pipe with a fluid flow passage therethrough has a heater housing mounted on the pipe exterior. The heater housing forms a cavity along the pipe exterior for receiving a heating element to heat fluids in the pipe flow passage. A preformed insulation layer extends around the pipe and heater housing unit to insulate them. A jacket is also preferably provided at the exterior of the insulation layer to protect the insulation layer.

Preferably, the heater housing is a channel shaped or concave member and is mounted with the pipe so that its open channel or concavity is oriented toward the pipe exterior to form the heater housing cavity. This structure enhances the heat transfer characteristics of the pipe assembly because the heating element disposed in the cavity comes in direct contact with the pipe exterior and a relatively large area of the pipe exterior is exposed to the heater housing cavity.

A plurality of such pipe assemblies are joined to form a pipeline which may either be placed above ground or buried beneath the earth's surface. A connecting assembly is provided with this invention to permit the assemblies to be joined. Each of the assemblies which form the pipeline include a preformed insulation layer; that is, the insulation layer is mounted on each assembly as the assembly is constructed so that the assemblies are transported to the pipeline installation site as preinsulated units. By providing such a preformed insulation layer, most of the insulating operations which previously had to be done in the field are performed at a manufacturing plant or other location where the assemblies are constructed. Only the connecting assembly need be insulated in the field when the pipeline of the present invention is installed. Consequently, use of production techniques for insulating the pipe assemblies is possible, and most of the pipeline insulation work is performed under the controlled environmental conditions found in manufacturing plants.

With the pipeline assemblies connected and in place at the the installation site, the heating element is placed in the heater housing cavity without disturbing or removing the preformed insulation layer on each pipe assembly. Pull lines are provided with the heating element. By applying a force to these pull lines, the heating element is moved into the heater housing cavity. Terminal stations are also provided with the present invention to permit access to portions of the heating element after it is installed in the heater housing cavity. These terminal stations are used to connect the heating element with a source of power and to permit testing and inspection of the heating element. Should replacement of the heating element become necessary, a pull assembly attached to the heating element is provided so that operator can remove the heating element from the heater housing cavity. Since the heating element is not permanently affixed to either the heater housing or the pipe, the operator may simply disconnect the heating element from the terminal stations and exert a force on the pulling assembly to move the heating element out of the heater housing cavity. Thus, the heating element may be removed from the pipeline without making it necessary to dismantle either the pipeline insulation or the heater housing.

BRIEF DESCRIPTION OF THE DRAWINGS

FIG. 1 is a sectional end view of one embodiment of the pipe assembly of the present invention.

FIG. 2 is a sectional end view of a second embodiment of the pipe assembly of the present invention.

FIG. 3 is a plan view illustrating portions of the connecting assembly used with the pipeline of the present invention.

FIG. 4 is a perspective view illustrating the connection of two pipe assemblies of the present invention.

FIG. 5 is schematic representation of a pipeline formed according to the present invention.

FIG. 6 is a partial sectional view of one embodiment of a terminal station of the present invention.

FIG. 7 is a partial sectional view of the pulling assembly of the present invention.

FIG. 8 is a perspective view of a second embodiment of a terminal station used with the present invention.

FIG. 9 is a perspective view illustrating the installation of heating elements in the pipeline.

DETAILED DESCRIPTION OF THE PREFERRED EMBODIMENTS

In the drawings, a letter P designates generally the pipeline of the present invention which is formed from a plurality of novel preinsulated pipe assemblies A, each of which includes a preformed insulation layer 1. The assemblies are joined together with a connecting means D to form the pipeline P. A heating means E, removably mounted with the connected pipe assemblies A, extends between terminal stations T which are provided at spaced intervals along the pipeline P. A pulling means F is attached to heating means E to permit removal of the heating means E during post-installation maintenance or repair of the pipeline P.

Considering the invention in more detail, FIG. 1 illustrates one embodiment of the pipe assembly A, which includes a pipe 12 having a fluid flow passage 14 therethrough. A heater housing 16 is mounted on an upper exterior portion 18 of pipe 12 and preferably extends longitudinally along the pipe exterior parallel to a central longitudinal axis 20 of pipe 12.

The heater housing 16 includes a substantially channel or C-shaped body 22 and a pair of arcuate, integrally formed flanges 24 which extend circumferentially on the exterior portion 18 of pipe 12. The flanges 24 are provided to stabilize housing 16 on pipe 12 and to facilitate mounting of the housing on the pipe. Preferably, the flanges 24 are welded to the pipe exterior, but housing 16 may be mounted with pipe 12 in any convenient manner. Regardless of what mounting means is used, housing 16 is affixed to pipe 12 with the concavity of the housing body 22 opening onto a pipe exterior portion 18 so that the housing body 22 and pipe exterior portion 18 form a cavity 26 extending parallel to pipe axis 20 for receiving heating means or element E. Of course, the dimensions of cavity 26 are larger than the dimensions of heating element E to allow the element to rest within cavity 26.

With element E operably disposed in cavity 26, fluids in flow passage of pipe 12 are controllably heated with element E. The heating element E is preferably an element having a pair of conductors 28 and 30 which are connected to a source of electrical energy for resistance type heating. As shown in FIG. 1, an insulating section 32 separates the two conductors, and a casing 34 houses the two conductors 28 and 30. Casing 34 may have a flattened oval shape as shown in FIG. 1 so that the contact area between the conductor and the pipe exterior portion 18 is maximized. However, it should be understood that other suitable heating elements may be used with pipe assembly A, and an element for cooling fluids in the flow passage 14 may be used in addition to or in lieu of heating element E, depending upon the particular application in which the pipe assembly is employed.

In any event, it should be noted that the structure of pipe assembly A gives the assembly exceptionally good heat transfer characteristics. Heating element E is positioned immediately adjacent to the pipe exterior portion 18 and directly contacts the pipe exterior to provide a maximum common surface area between the pipe exterior and heating element E through which heat may be directly transferred to the pipe 12. Further, the total heat transfer area, that area of the pipe exterior through which heat is transferred from the heating element to the pipe is relatively large. Unlike many prior art devices which had limited heat transfer areas and consequently inefficient heat transfer characteristics, the heat transfer area of apparatus A, designated generally in cross-section by the heavy line 36, is equal to or greater than the width of heating element E so that the heat emitted by element E is efficiently transferred through pipe 12 to flow passage 14.

The insulation layer I is mounted around the exterior of pipe 12 and the heater housing 16 mounted therewith to form an annular sleeve around those elements. It extends longitudinally on assembly A to insulate pipe 12 and heater housing 16 from outer environmental conditions and to ensure that heat from the heating element E is transferred only in the direction of pipe 12. The insulation layer is preformed; that is, it is mounted with assembly A as the assembly is constructed so that the assembly is transported to the pipeline installation site as preinsulated unit. Preferably, the insulation layer I is mounted on assembly A at substantially the same time or immediately after heater housing 16 is mounted with pipe 12 and before element E is placed in cavity 26. Generally, insulation layer I is mounted on assembly A at a manufacturing plant or other location where the assembly is being constructed.

In the preferred embodiment of the present invention insulation layer I is a urethane foam or gel. A protective jacket 37 which is resistant to rotting or corrosion caused by environmental conditions extends around insulation layer I to protect the insulation layer and provide support for it. However, it should be understood that since the insulation layer I and protective jacket 37 are mounted on pipe 12 at a manufacturing plant or other construction site, conventional production techniques may be used in constructing the insulation and jacket. Accordingly, the materials for layer I and the method of applying of the layer and affixing to pipe 12 may vary considerably. The use of production of techniques not only affords latitude in the type of insulation layer I mounted with assembly A, but generally results in an insulation layer of a quality superior to insulation which is applied at the installation site of a pipeline. By providing preformed insulation layer I with the assemblies A of the present invention, the present invention provides a pipe assembly which may be transported to the installation site as a preinsulated unit, thus eliminating the necessity of insulating pipe assemblies at the installation site, reducing the time and expenditures required in installing the assemblies to form pipeline, and insuring that a better insulated assembly is used to form pipeline P.

FIG. 2 illustrates a second embodiment of pipe assembly A according to the present invention. Except as otherwise noted below, the assembly illustrated in FIG. 2 is substantially identical to the assembly A illustrated in FIG. 1, and like reference numerals are used in the drawings to indicate corresponding elements in the assemblies.

The assembly A illustrated in FIG. 2 employs a cylindrical conduit 38 having a cavity 26 therethrough as the heater housing for the assembly A. Housing 38 is mounted on an upper exterior portion 18 of pipe 12 and preferably extends longitudinally on the pipe exterior parallel to a central longitudinal axis 20 of pipe 12.

A plurality of bands 40 extend around pipe 12 and heater housing 38 to mount the housing 38 with pipe 12. Mounting band 40 is held taut by a crimped fastener 42. Of course, as was the case with the assembly A illustrated in FIG. 1, any other suitable means for mounting housing 38 with pipe 12 may be employed. While heater housing 38 contacts with the exterior 18 of pipe 12 only at longitudinally extending lines illustrated in the crosssectional view of FIG. 2 as 44, a heat transfer adhesive means 46 bonds heater housing 38 to pipe 12 and enhances heat transfer from heating element E through heater housing 38 to the exterior portion 18 of pipe 12. The heat transfer adhesive means 46 is preferably the type sold under the trademark "Thermon" (a trademark of Thermon Manufacturing Company of San Marcos, Tex.) and identified as Thermon T-85 heat transfer cement. However, any suitable adhesive having a high thermal conductivity may be used with apparatus A. Because of the high thermal conductivity of the heat transfer adhesive means 46, the effective heat transfer area of the pipe apparatus A illustrated in FIG. 2 extends throughout the entire common surface areas of the heat transfer adhesive means 46 and the pipe exterior portion 18. Line 48 in FIG. 2 illustrates a cross-sectional view of this effective heat transfer area.

As previously noted, pipe assemblies A are constructed at a manufacturing plant or other construction site and transported to the pipeline installation site as preinsulated units. The assemblies A may be of any convenient length, but generally are as long as the standard pipe joint length of the particular type of pipe being used with the assemblies A.

Once the pipeline is at the construction site, the assemblies A are joined together by connecting means D illustrated in FIGS. 3 and 4. To facilitate explanation of connecting means D, assemblies A shown in the drawings are labeled as assemblies 50 and 52, but it should be understood that the assemblies are pipe assemblies A previously discussed with reference to FIGS. 1 and 2. The connecting means D which extends between assemblies 50 and 52 includes a first pipe extension 54 mounted with assembly 50 and a second pipe extension 56 mounted with assembly 52. Each of the extensions 54 and 56 has a flow passage extending through it and communicating with the flow passage 14 of the assembly with which it is mounted. Preferably, the longitudinal extension of insulation layer I in jacket 37 is abbreviated on assembly 50 so that pipe extension 54 is merely a protruding end of pipe 12 of assembly 50, and the flow passage through extension 54 is a continuation of flow passage 14 of pipe 12. However, as indicated by dashed line 58 denoting a weld seam, extension 54 may be a short piece of pipe substantially identical in dimensions to pipe 12 and welded to pipe 12. The flow passage through pipe extension 54 forms an extension of flow passage 14 through pipe assembly 50. Similarly, the portion 60 of pipe extension 56 mounted with assembly 52 may be an end portion of pipe 12 extending through assembly 52. Alternatively, the entire pipe extension 56 may be an integrally formed pipe extension welded or otherwise suitably mounted with pipe 12 of assembly 52 to form a continuation of flow passage 14 through assembly 52. In either event, the portion 64 of extension 56 extending the farthest away from assembly 52 has a receiving portion 56 with a central bore therethrough of sufficient dimensions to receive the inner portion 68 of extension 54. As can be seen from FIGS. 3 and 4, once the extensions 54 and 56 are mounted with their respective assemblies 50 and 52 and receiving portion 66 of pipe section 64 receives end portions 68 of extension 54, the flow passages 14 through assemblies 50 and 52 are connected and communicate with one another through connecting means D. Extensions 54 and 56 are welded at joint 69 or otherwise joined together.

Also illustrated in FIGS. 3 and 4 is heater housing extension means 70 to form a cavity communicating with the cavities 26 formed by heater housing 16 of assembly 50 and by heater housing 16 of assembly 52. The heater housing extension means 70 includes a central member 72 which spans a substantial portion of connecting means D and two smaller mounting members 74 and 76 which connect the central member 72 with heater housing 16 of the respective pipe assemblies 50 and 52. The central member 72 may have a slightly arcuate shape to compensate for the enlarged receiving section 66 of extension 64 so that the central member 72 is readily mountable with housing members 16. At the junction of housing 16 and central members 72, the mounting members 74 and 76 rest over the upper portions of housings 16 and central member 72. Mounting members 74 and 76 may be slightly smaller in diameter than either housings 16 or 72 so that once a force is exerted on the top of the mounting members a downward force will be exerted both on housing 16 and central member 72 to force those members into firm engagement with the pipe extensions of connecting means D. As shown in FIG. 4, a mounting band 78 extends tightly around the mounting members 74 and 76 to exert a downward force on the mounting members. Additional mounting bands 80 are also attached to housing 16 and central member 72 to hold the central member 72 and housings firmly in place against the connecting means D. Once the heater housing extension means is thus securely mounted with connecting means D, the extension means 70 forms a cavity communicating between the cavities 26 of heater housings 16 and provides a continuous heater housing cavity through both assemblies.

With the heater housing extension means 70 and connecting means D in place, an insulation layer indicated generally by dashed lines 82 is formed around connecting means D and heater extension means 70 so that the connected assemblies 50 and 52 form a fully insulated pipeline segment. While the insulation layer 82 may be of any conventional, commercially available type for field installation, typically it is an insulation formed in strips which are wrapped around the elements to be insulated. The insulating layer may be composed of urethane or a variety of other known insulating materials.

FIG. 5 illustrates a preferred embodiment of pipeline P which is formed with connected pipe assemblies A and buried, in substantial part, beneath ground level 84. As shown, end pipe assemblies 86 and 88 are formed with a vertical elbow portion 90 so that the pipeline extends vertically and emerges above ground level 84 at desired locations 92 and 94. Other pipe assemblies may similarly be formed with horizontal elbow portions where the pipeline does not extend in a straight path between locations 92 and 94.

Pipeline P may, of course, be formed with any number of assemblies A, depending on the length of the pipeline required or a particular application of pipeline P. Regardless of the number of assemblies used, however, the assembly pipes 12, in conjunction with the connecting means D between them, act as a single pipe 96 and form a continuous pipeline flow passage through the entire pipeline P.

Terminal stations T positioned at or above ground level 84 are provided at spaced intervals along the length of pipeline P, and the heater housing 16 of assemblies A are connected to the terminal stations. The terminal stations T - 1 provided on end pipe assemblies 86 and 88 where pipeline P emerges from beneath ground level 84 are preferably attached to pipe 12 of the respective assemblies at the end of housing 16 by a plurality of bolted yolks 97 (FIG. 8) or other convenient mounting means. For terminal stations T2 mounted at positions where pipe 96 is buried beneath ground level 84, heater housing connecting members 98 are provided to connect heater housings 16 to the terminal stations T2. These connecting members 98 are preferably mounted on a stand pipe 100 or other suitable structure to provide support for the connecting members and form a cavity communicating with cavity 26 of heater housings 16 for receiving heating element E. Thus, the housing 16 extension means 70 and connecting members 98 cooperate to form a pipeline heater housing 102 which forms a continuous heater cavity between each of the terminal stations T.

The structures of terminal stations T1 and T2 are illustrated in FIGS. 8 and 6 respectively. Terminal station T1 includes a housing 104 mounted with pipe 12 by bolted yolks 97. A doorplate not shown in FIG. 8 is provided to permit access to the interior of the housing. A lower wall 106 of housing 104 has two bores 110 and 112. Bore 112 serves as a drain to remove any moisture which might enter the interior of housing 104. Bore 110 is formed to receive an end of heating element E. Once heating element E is extended through bore 110 a seal made of silicone rubber or other suitable material is placed in the bore around heating element E to prevent any moisture from seeping into heater housing 16. The portion of heater element E which extends into housing 104 is attached to a terminal block 114. A source of power is also attached to terminal block 114 to provide power for actuating heating element E.

Junction station T2 shown in FIG. 6 is particularly adapted to be positioned partially underground. An outer concrete utility box 116 surrounds an inner junction box 118 and protects the inner junction box 118 from the corrosive effects of the surrounding soil. As shown in FIG. 5, it is preferable that utility box 116 be positioned such that an upper rim 120 extends slightly above ground level 84. Access to inner junction box 118 is permitted through a removable cover 122 of utility box 116. A pair of bores 124 and 126 extend through the bases of junction box 118 and utility box 116 and provide an opening communicating with the pipeline heater housing 102 so that the heating element E may be extended through the bores and connected to a junction block 128. A source of power may also be connected to junction block 128 to provide additional power for the operation of heating E. As explained in more detail hereinbelow, pull means F which is attached to heating element E also extends through one or both of bores 124 and 126. If a a pull means F is not provided in both bores, the bore without the pull means is sealed with a seal made of silicone rubber or other suitable material to prevent any moisture from seeping into pipeline heater housing 102.

As indicated above, heating element E when installed in pipeline P is removably attached to terminal station T. It is not, however, permanently affixed to either pipe 96 or pipeline housing 102 after the assemblies A are connected and the pipeline has been completely insulated. Consequently, if the heating element ever needs to be replaced or repaired, the element is simply detached from terminal stations T and pulled out of the cavity of pipeline heater housing 102 using a pulling means F provided with the present invention.

To install the heating element E between two terminal stations T, a flexible line having absorbent material attached to it is first pulled through the pipeline housing 102. This step ensures that the cavity is dry prior to the placement of heating element E in housing 102. Next, an end of heating element E is extended a short distance into the cavitty as shown in FIG. 9. A pull line 130 is detachably connected to the heating element E with removable clamps 132. To move the element E further into the cavity, a force is exerted on the pull line 130 until one of the clamps 132a nears the cavity entrance 134. The clamp nearest the cavity entrance is then removed, and a force is again exerted on the pull line to slide the element E further into the cavity. This step of repeatedly pulling on the pull line 130 is continued until the element E is extended through housing 102 to a terminal station T2.

The heating element E is then attached to terminal boxes in the terminal stations between which the element E extends, and seals are placed in the entrances to the cavity formed by the pipeline housing 102.

To remove the heating element E after it has been installed, a pulling means F (FIG. 7) is attached to the heating element E upon installation of the element E, and pulling means F is positioned in bore 124 of terminal stations T2. The pulling means F includes a washer 136 made of insulating material. Conductors 28 and 30 of heating element E extend through washer 136 and are rigidly affixed to the washer in any convenient manner. A pull rod 138 extends from the interior of junction 118 through the washer 136 and is permanently affixed to a base 140 of washer 136. The pull rod 138 and conductors 28 and 30 are insulated from each other and bore 124 is sealed by a seal 142 which is made of silicone rubber or other suitable material. A pull rod handle 144 is provided so that a force in the direction of arrow 146 is easily exerted on pull rod 138. Using pulling means F, heating element E is easily removed from between terminal stations T without necessitating any damage to the pipeline insulation or other elements of the pipeline. The element E is first disconnected from the terminal boxes of the terminal stations T between which the element extends. A force in the direction of arrow 146 is then exerted on pull rod 138 to overcome the initial sliding resistance of element E and to pull washer 136 and a portion of element E out of bore 124. The remainder of element E is then pulled through bore 124 to complete removal of the heating element E.

From the above description of pipe assemblies A and pipeline P, it can be seen that the present invention provides many advances in the art. The assemblies A are constructed and transported to the pipeline installation site as preassembled units, thus reducing pipeline installation expenditures and making it possible to use improved insulation techniques with the pipeline. Because of the structure provided, the heating element of the pipeline is easy to install and remove after installation; yet, the heat transfer characteristics of the pipeline are excellent. Further, with terminal stations above the ground level and the heating means connected to the terminal stations, the heating element is always accessible at a number of locations along the pipeline for post-installation maintenance and repair.

It should be understood that the foregoing disclosure and description of the invention are illustrative and explanatory therof, and various changes in the size, shape, and materials as well as the details of the illustrated construction may be made without departing from the spirit of the invention. By way of example, but not limitation, it can be seen from FIG. 9 that a plurality of pipeline housings may be provided with pipe 96. Other shapes of heater housings may also be used with the present invention, and the heater housings may be filled with oil or other fluid to enhance heat transfer, providing the connections between the housings and pipe 96 are made to be fluid tight. Additionally, it should be noted that the pipeline P is equally well suited for installation above ground level, although the pipeline was described above as being an underground pipeline.

I claim:

1. A preinsulated pipe assembly for handling fluid, comprising:
 a pipe having a fluid flow passage therethrough;
 a heater housing mounted with said pipe and forming a cavity along the exterior of said pipe;
 said heater housing including a channel member mounted on the exterior of said pipe such that said channel member and the exterior of said pipe form said heater housing cavity;
 heating means disposable in said heater housing cavity for heating fluid in said flow passage of said pipe; and
 pulling means mountable with said heating means for controllably pulling said heating means from said heater housing cavity without removal of said heater housing from said pipe.

2. The structure set forth in claim 1, wherein:
 said pipe is at least partially underground; and
 said pulling means is accessible from ground level, whereby said heating means is removable from said heater housing cavity with said pipe and heater housing in place underground.

3. The structure set forth in claim 1, further including:
 power connecting means mounted with said pipe for connecting said heating means to an energy source for actuating said heating means.

4. The structure set forth in claim 1, further including:
 mounting means for mounting said heater housing with said pipe.

5. The structure set forth in claim 1, further including:
 a protective layer on the exterior of said insulation layer for protecting said insulation layer.

6. The structure set forth in claim 1, wherein said heating means has dimensions permitting said heating means to slide into said heater housing cavity and further including:
 line means detachably connected to said heating means for exerting a force on said heating means to slide said heating means into said heater housing cavity.

7. A pipeline for handling fluid, comprising:
 a plurality of preinsulated pipe assemblies;
 each of said pipe assemblies being aligned adjacent another of said pipe assemblies and including:
  a pipe having a fluid flow passage therethrough;
  a heater housing mounted with said pipe and forming a cavity along the exterior of said pipe; and
  a preformed insulation layer mounted with said pipe and said heater housing;
 heater housing extension means mounted between said adjacent pipe assemblies for forming a cavity communicating with said heater housing cavities; and
 connecting means for connecting said flow passage of each of said pipe assemblies with said flow passage of said pipe assembly adjacent thereto, whereby said fluid flow passages of said pipe assemblies are connected and form a pipeline for handling fluids.

8. The structure set forth in claim 7, further including:
 terminal stations mounted at spaced intervals along said pipeline;
 heating means extending between said terminal stations and disposed in said cavities of said heater housings and said heater housing extension means for heating fluid in said flow passages of said pipe assemblies; and
 said terminal stations being mounted with selected pipe assemblies for permitting access to said heating means disposed in said heater housing and heater housing extension means cavities.

9. The structure set forth in claim 8, further including:
 pulling means mounted with said heating means for controllably pulling said heating means from said heater housing and heater housing extension means cavities, whereby said heating means is removable from said cavities.

10. The structure set forth in claim 9, wherein:
 said pipeline is at least partially underground; and
 said pulling means is accessible from ground level, whereby said heating means is removable from said cavities with said pipeline in place underground.

11. The structure set forth in claim 7, wherein said connecting means includes:
 a first pipe extension mounted with a first pipe assembly and having a flow passage therethrough communicating with said flow passage of said first pipe assembly;
 a second pipe extension mounted with a second pipe assembly adjacent said first pipe assembly; and
 said second pipe extension having a flow passage therethrough communicating with said flow passages through said first pipe extension and said second pipe assembly.

12. A preinsulated pipe assembly for handling fluid, comprising:
 a pipe having a fluid flow passage therethrough;
 a heater housing mounted with said pipe and forming a cavity along the exterior of said pipe;
 said heater housing including a cylindrical conduit mounted on the exterior of said pipe and heat transfer adhesive means for bonding said conduit to said pipe exterior and enhancing heat transfer from said heater housing to said pipe;
 a preformed insulation layer mounted with said pipe and said heater housing for insulating said heater housing;
 heating means disposable in said heater housing cavity for heating fluid in said flow passage of said pipe; and
 pulling means mountable with said heating means for controllably pulling said heating means from said heater housing cavity without removal of said heater housing from said pipe.

* * * * *